R. WILLIAMSON.
MACHINE FOR MAKING HOLLOW GLASS ARTICLES.
APPLICATION FILED SEPT. 23, 1912.
1,147,695.
Patented July 20, 1915.
3 SHEETS—SHEET 1.
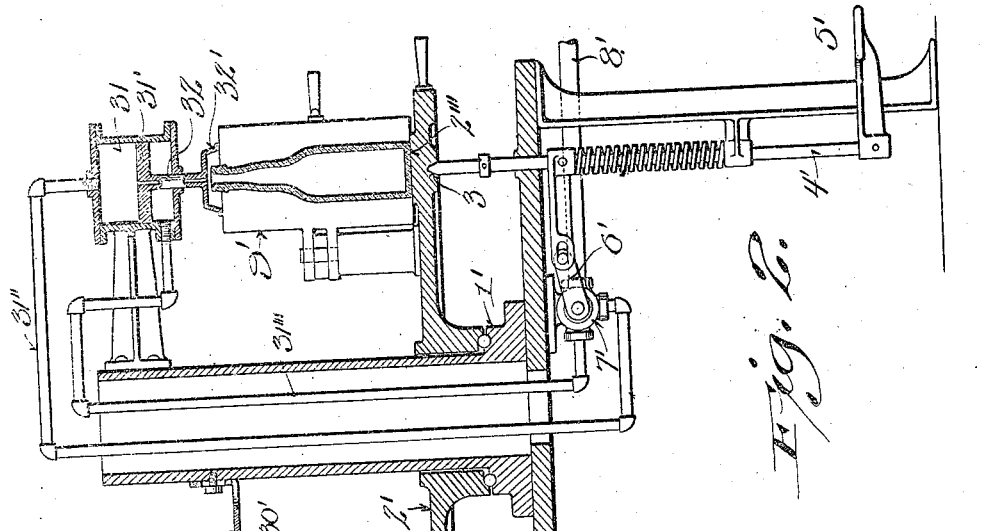
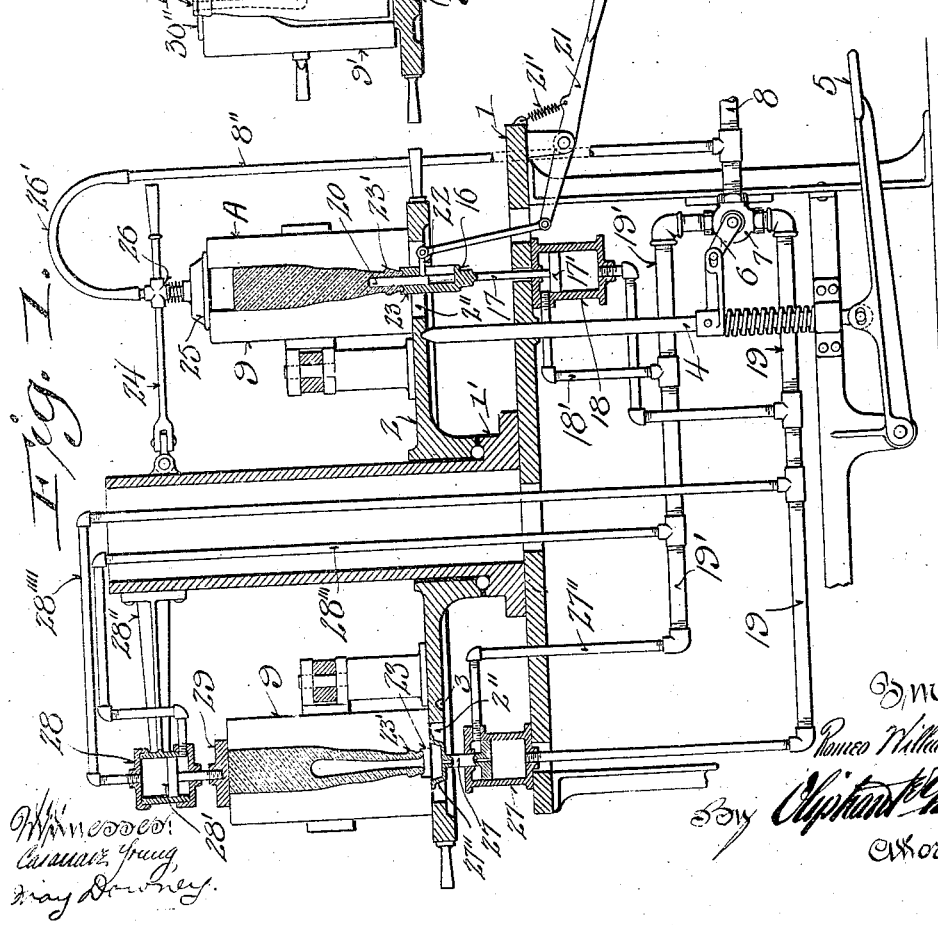

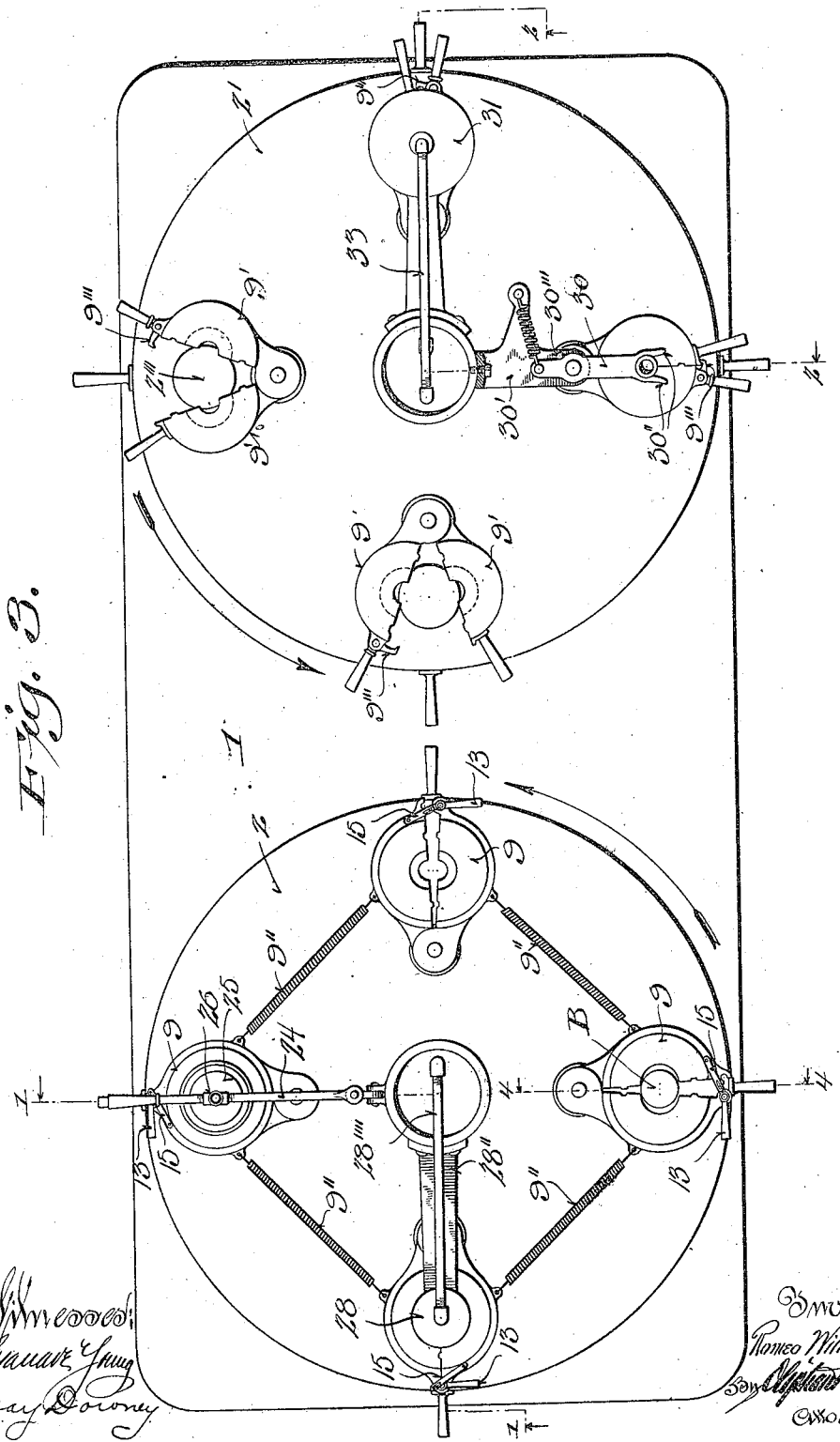

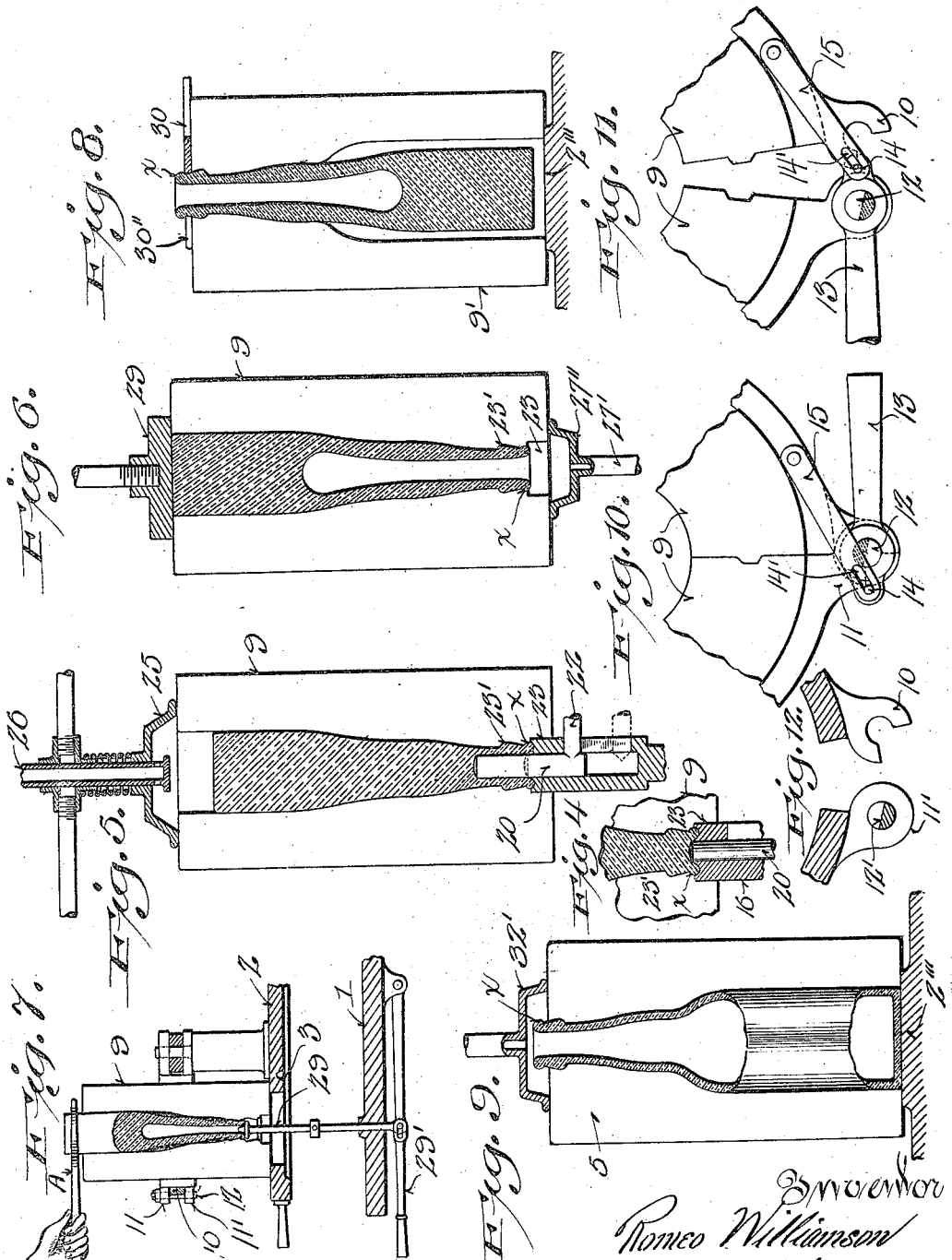

UNITED STATES PATENT OFFICE.

ROMEO WILLIAMSON, OF MILWAUKEE, WISCONSIN, ASSIGNOR TO WILLIAMSON MACHINERY COMPANY, OF MILWAUKEE, WISCONSIN.

MACHINE FOR MAKING HOLLOW GLASS ARTICLES.

1,147,695.  Specification of Letters Patent.  Patented July 20, 1915.

Application filed September 23, 1912. Serial No. 721,990.

*To all whom it may concern:*

Be it known that I, ROMEO WILLIAMSON, a citizen of the United States, and resident of Milwaukee, in the county of Milwaukee and State of Wisconsin, have invented certain new and useful Improvements in Machines for Making Hollow Glass Articles; and I do hereby declare that the following is a full, clear, and exact description thereof.

My invention refers to machines for making hollow glass articles, the primary object being to provide simple, economical and effective means for forming a parison, the neck portion of which article is completed incidental to completion of the parison.

The mechanical elements are preferably arranged upon a pair of revoluble tables in juxtaposition to each other, whereby a plurality of molds can be utilized as a feeder for a single plunger-carrying mouth-forming one-piece ring, whereby the blow opening and mouth of the vessel is formed, in which operation the exterior wall of the neck is completed. The parison, together with its mold, is thereafter shifted between a simple blowing cup and fluid pressed bottom block, whereby air is admitted to the neck of the bottle to complete the parison and in opposition to the opposing force of the bottom block. By utilizing mechanism as above described I thus dispense with duplicating complicated mechanism, whereby the parison is completed by blowing through hollow mandrels or the like. In my machine the completed parison is mechanically stripped from the parison mold and automatically centered in a finishing mold carried by a finishing table, the finishing mold being then centered under a second finishing blow-cup similar to that mentioned in connection with forming a parison, whereby the bottle is finished by the admission of air to fill out the body of the bottle, or other article, the bottom thereof being forced against a resisting surface of the table that forms a closure for the body end of the vessel. In a general way it will be observed that the head of the bottle is formed in the parison mold and entirely within said mold, there being a throat formed in the mold that communicates with the head cavity thereof, whereby a solid ring is inserted to form a bottom, against which the mass of glass is forced and thereby finished without seams, the plunger carried by said ring being arranged to enter the neck of the parison to form a blow opening.

Specific objects of my invention are to provide a hollow one-piece mouth-forming ring that is under fluid pressure control and carries a solid blow-opening plunger that is in telescopic union therewith; to provide a manually controlled air discharge cup in axial alinement with the mouth ring for closing the body end of the mold and for admitting air under pressure thereto coincident to forming the mouth and blow opening, the air resistance serving to force the parison down solidly within and fill out the neck portion of said mold; to provide an axially alined air-controlled mold bottom closing block in conjunction with a neck-blowing cup that is in non-engagement with the interior portion of the mold, whereby the parison is blown to completion in opposition to the resisting block; to provide means for stripping the parison from the mold preparatory to the same being seated within a finishing mold; to provide a finishing mold wherein the neck portion thereof will hold the head of the parison in suspension with the mouthpiece or beaded head projecting above said mold, together with means for centering said parison neck, coincident to its being clamped in the finishing mold; to provide an air-supply cup for closing the mold-head in opposition to a flat bottom face, whereby the body of the bottle is blown to completion free of any member being inserted within the neck thereof, and to provide a simple, economical and effective locking mechanism for the two-piece molds.

With the above and other objects in view the invention consists in certain peculiarities of construction and combination of parts as set forth hereinafter with reference to the accompanying drawings and subsequently claimed.

In the drawings Figures 1 and 2 represent diagramamtic sectional elevations of a machine embodying the features of my invention, the sections being indicated by lines 1—1 and 2—2 respectively of Fig. 3; Fig. 3, a plan view of the machine as it would appear in its complete assemblage; Fig. 4, an enlarged detail sectional view of the mouth-forming ring and its mandrel, together with a portion of the mold, showing the relative position of the parts when the mass of glass is inserted therein preparatory to forming a parison; Fig. 5, illustrates a sectional view also upon an enlarged scale showing the next step in forming the parison; Fig. 6, a sectional view illustrating the third step in forming the parison wherein the same is completed; Fig. 7, a sectional view illustrating the mechanism for stripping the completed parison from the apparatus preparatory to its being inserted into a finishing mold; Fig. 8, a sectional view illustrating the parison held in suspension within the finishing mold; Fig. 9 illustrates the finished bottle, the mold being inserted between a fixed bed and blow-cup, whereby said bottle is completed by the admission of air through the cup in opposition to the bottom body closure; Figs. 10 and 11 show enlarged plan views of the mold-locking mechanism in its closed and open position respectively, and Fig. 12, a sectional view of the same in its open position.

Referring by characters to the drawings, 1 represents a bench provided with hollow hubs 1' for the reception of rotary tables 2, 2', respectively. Each table is provided with a series of notches 3 for the reception of spring-controlled rods 4, 4', which rods are manually depressed by the foot-treadles 5, 5', the same being carried by the bench and are reciprocated in suitable supports. Each of these rods carry arms that are in shackle connection with valve-cranks 6, 6', of two-way air valves 7, 7', which valves are supplied with air from any suitable source through pipes 8, 8'. The table 2 is provided with a series of two-part hinged parison molds 9 that are normally held apart by springs 9'', each of the same being closed by the locking mechanism, which mechanism, as best shown in Figs. 10, 11 and 12, comprises a segmental ear 9' that is adapted to enter between a pair of ears 11, 11', and engage a bolt 12 that is revolubly mounted within the ears 11, 11', the bolt being provided with a semicircular portion 12' to permit clearance, whereby the segmental ear is free to engage the same. One end of the bolt is provided with an actuating handle 13, from the head of which is extended a pin 14 that enters a slot 14' in one end of a link 15, the opposite end of which link is fulcrumed upon that mold-member which carries the single segmental ear 10.

As shown in Fig. 11, when the mold-members are separated by the draw of the springs 10 the link 15 and pin 14 of the hand-lever 13 will serve to prevent further spreading of said members and when it is desired to close said mold the hand-lever is turned to the position illustrated in Fig. 10, whereby the pin 14 will engage the end of the link-slot and thus impart a draw in opposition to the springs 10. Thus said molds are closed and in revolving the hand-lever 13 to the position shown in Fig. 10 it is apparent that the bolt 12 will be rotated so that its semicircular portion 12' will assume a locking position with relation to the segmental ear.

The table 2 is provided with apertures 2'' that are alined with the parison molds carried thereby, the said apertures being provided for entrance of a reciprocative mouth-forming ring 16, which is carried by a piston-rod 17 having a piston 17' that is reciprocatively mounted within a cylinder 18, which cylinder is suitably secured to the under side of the bench. One end of the cylinder is connected by a branch-pipe 18' to a feed-pipe 19', which pipe also communicates with the valve aforesaid. The forming ring 16 is also centrally apertured for the reception of a solid plug 20 that is in telescopic union with the ring, the same being actuated by a lever 21 that is linked to a stem 22, which stem projects through a side slot in the ring.

As shown in Fig. 1, the ring is in its operating position and is snugly fitted within a circular mouth 23 of the parison mold, which mouth forms a continuation of a bottle-head cavity 23', from which bottle-head cavity the parison mold cavity assumes the shape of a bottle-neck and from thence extends throughout the mold in cylindrical form that is of less diameter than a finished bottle. In shackle connection with the hub 1' is a hand-lever 24, which lever carries an air-receiving shell 25 that is mounted upon a hollow stem 26 that forms part of the hand-lever 24. A coiled spring is interposed between the handle and shell, whereby said shell is normally held against a flanged ported head of the stem 26 to thus close said ports. Air is admitted to the hollow stem through a direct branch 8'' of the main supply pipe 8 which is connected to said hollow stem 26, by a flexible pipe section 26'. The bench 1 also carries an air cylinder 27 having a piston head reciprocatively mounted therein that is carried by a channeled piston-rod 27', which rod terminates with a cupped blow head 27'', the same being adapted to enter that table aperture 2'' which is alined therewith and close the mouth opening 23 of the parison mold by engagement of its edges with the under face of said mold. The upper end of the air cylinder 27 is connected by a branch-pipe 27'' to the air feed-pipe 19' and the opposite or lower end of said cylinder is similarly connected to the air feed-pipe 19, whereby the position of the piston and cupped head 27'' is controlled. Mounted in axial alinement with the air cylinder 27 and above the alined parison mold 9, is a fixed air cylinder 28 having a piston 28' therein, the piston-rod of which carries a block 29 that is adapted to close the open body end of the mold, the said cylinder being secured to the hub 1' by a bracket 28″. The lower end of the air cylinder 28 is supplied with air through a branch-pipe 28‴ that communicates with the feed-pipe 19′ and the upper end of said cylinder is supplied with air from the feed-pipe 19 through a branch-pipe 28⁗, these pipes being for convenience led through the hollow table hub.

The above described mechanism all refers to the parison-forming mechanism and the bottle is completed upon the table 2′, which table is provided with a series of hinged two-part finishing molds 9′ that are similar in construction to those mentioned in connection with the parison-mold with the exception that they are locked by hand-controlled snap-dogs 9‴ that are carried by one of the mold members for engagement with a tooth of the opposite mold member, this locking mechanism forming no part of my invention.

The neck-cavities of the finishing molds are so positioned relative to the height of the latter that when the parison with its completed bottle-neck is inserted therein the head-bead x, of the parison will project slightly beyond the upper face of the mold as shown, it being understood that the body-cavity is of such dimensions that the parison when blown out will give the desired shape to the bottle or other vessel that is to be formed. The finishing table 2′ is provided with slightly raised faces 2‴ that serve as closures for the bottom of the molds and when the parison, as shown, is inserted within the mold, it will remain in suspension, being clear of the mold closing 2‴.

As shown in Fig. 7 of the drawings, and from the foregoing description, it is apparent that the parisons are formed inverted and when it is desired to remove a completed parison from the mold the other incomplete parisons are being formed in certain of the molds and the table is held against rotation with that mold which contains a completed parison in alinement with a reciprocative finger 29. This finger is suitably guided in the bench 1 and connected to a hand-lever 29′ and hence to remove the parison the hand-lever is actuated, whereby the stripper finger is caused to rise through the table aperture 2′ that is alined therewith and enter the head cavity of the mold, in which position it engages the beaded edge of the parison and thus slightly lifts the same from the mold cavity, whereby its body end will be exposed for gripping engagement of a hand-tool A. Thus the parison is extracted from the mold by the hand-tool and being inverted is inserted in the finishing mold, assuming the position indicated at B, Fig. 1.

In order to center the parison in the open finishing mold I provide a spring-controlled fulcrumed supporting arm 30, which arm is mounted upon a bracket 30′ that is secured to the hub 1′ of the table 2′. The end of the arm terminates with a pronged mouth 30″, into which the bottle is inserted and the mouth bead of said bottle will thus rest within the pronged arm mouth and be thereby centered relative to the mold, the said parison being held in its suspended and centered position until such time as the mold is closed thereover, whereby its neck is then securely clamped and the mold, together with the table is rotated a quarter of a turn to thus bring said mold member in alinement with finishing mechanism.

In rotating the mold member together with the parison from its starting point it is apparent, by referring to Fig. 3, that the arm 30 will permit the beaded head of the parison to clear from its pronged mouth, due to the fact that said arm will revolve about its axis and when so cleared the arm will return to its normal alined position and be held in this position by a stop-pin 30‴. After leaving the centering arm 30 the mold containing the parison is alined under an air receiving cylinder 31 which is rigidly secured to the bench-hub 1′, the cylinder being provided with a piston 31′ having a channeled piston-rod 32 that carries a cupped head 32′, which cupped head is adapted to be chucked against the adjacent end of the mold, whereby the open mouth of the parison is enveloped. This chucking operation of the cupped head is effected through upward movement of the rod 4′, whereby the table and mold are centered under the cylinder 31, the chucking being effected through shift of the valve 7′ due to its connection with the rod 4′, whereby air from the supply-pipe 8′ is admitted to the upper end of the cylinder 31 through a branch-pipe 31″, air being admitted to the opposite end of the cylinder through a branch-pipe 31‴ that is also connected to the two-way valve as shown in Fig. 2.

Particular attention is called to the fact that in this machine only a single mouth-forming ring and mandrel is required and that the blowing operation both for the parison and completed article is effected by the admission of air from similar cups which envelop the opposite ends of the molds by which simple mechanism the bottles are finished more uniformly and without tendency to mar or roughen the edges through the insertion of hollow tools or other mechanism within the neck of the vessels or bottles.

In the operation as best shown in Figs. 1 and 4 of the drawings, when the mold A is in the position shown in Fig. 1 and the table centered by the rod 4 the upward movement of said rod will, through its connection with valve 7 cause air to be admitted to the lower end of cylinder 18. The forming ring 16 is thus forced upward into the mold mouth to close the head cavity therein, the mandrel being in the position shown in Fig. 4. Thus the ring and mandrel together present an unbroken closure surface for the mold against which the gather of molten glass will rest, which gather is deposited in the body opening of the mold from above. The operator next swings the handle 24 to the position shown in Fig. 1 and forces the shell 25 over the upper end of said mold to close the body cavity and co-incident to this movement air is admitted to the mold cavity, whereby the parison is forced down and the exterior surface of the neck of the vessel or bottle is formed. The operator now forces the ring plunger 20 upward by exerting power upon the handle 21 that is in link connection therewith, the plunger assuming the position shown in Figs. 1 and 5, whereby the molten glass is displaced to form a cavity or blow opening within the neck. The outer face or lip portion of the bead $x$ is thus formed by a semi-circular cavity in the face of the ring, whereby the seam ordinarily formed in said lipped portion is dispensed with and thus the finished bottle at the mouth of the head will present a smooth, unbroken surface. Pressure upon the foot treadle 5 will now cause downward movement of the rod 4 to release the table, whereby the mold containing the incomplete parison is shifted to another position for completion. In this downward movement of the rod 4 the two-way air-valve 7 is shifted, whereby air is admitted through pipe 19′, and the branch-pipe to the upper end of cylinder 18 and thus the ring is withdrawn from the mold to a position whereby it will clear the under face of the table, the solid plunger 20 being retracted to its normal position by this movement, together with a retracting spring 21′ that is connected to the hand-lever 21. Presuming that when this shift takes place, and the incomplete parison in the mold will be brought into alinement with the air cylinder 28 and air cylinder 27 and hence when the rod 4 moves upward to lock the table in the position shown in Fig. 1 at the same time that air is admitted under the piston 17 of cylinder 18 it is also admitted to cylinders 28 and 27, whereby their pistons are forced toward each other to thus chuck the parison mold that is positioned between the same. In this movement the block 29 is forced against the upper end of the mold to close the body cavity, while the cupped head 27″ is similarly positioned to incase the mouth cavity 23′. Hence while air pressure will solidly hold the block 29 in position air is admitted through the channeled piston 27′ and cupped head 27″, whereby the parison is blown to completion as shown, the air entering through the unobstructed blow opening in the mouth of the bottle-head, the same being also clearly illustrated in Fig. 6. After this operation the table is again shifted, whereby the completed parison is brought into alinement with the stripper finger 29 and said stripper-finger is actuated to lift the bottle to the position shown in Fig. 4, in which position the gripping tool A manipulated by the operator is caused to engage the projecting end of the parison, whereby it is lifted from the mold and inserted in the finishing mold, being suspended in the position as shown in Figs. 2 and 8, in which suspended position it is held by the arm 30 until such time as the mold is closed and shifted together with the table to the position in alinement with the cylinder 31. In this position the cupped head 32′ is forced downward by the air pressure admitted to valve 7′ and said air is also directed through the channel piston and cupped head, whereby the body of the bottle is blown to completion, the bottom, which was previously in suspension, being forced down against the surface 2‴ of the table, which surface forms a body closure for the finishing mold, the finished bottle being clearly illustrated in Figs. 2 and 9.

I claim:

1. A machine of the character described comprising a revoluble table, a series of parison molds carried upon the table, a reciprocative ring for engagement with the ends of the parison molds, a plunger within the ring, independent actuating means for the plunger, an air-receiving shell in alinement with the plunger adapted to close the opposite end of the mold, a fixed cylinder disposed above the path of travel of the parison molds, a plunger actuated block carried by the cylinder for closing the upper ends of the molds, and a plunger actuated cupped head in alinement with the block and disposed beneath the path of travel of the parison molds, the cupped head being provided with means for admitting air to the mold cavity.

2. A machine of the character described comprising a revoluble table, a series of parison molds carried upon the table, a reciprocative solid ring for engagement with the ends of the parison molds, a plunger within the ring, an air-receiving shell in alinement with the plunger adapted to close the opposite end of the mold, a fixed cylinder disposed above the path of travel of the parison molds, a plunger actuated block carried by the cylinder for closing the upper ends of the molds, and a plunger actuated blow head in alinement with the block and disposed beneath the path of travel of the parison mold, the blow head being provided with means for admitting air to the mold cavity.

3. A machine of the character described comprising a revoluble table, a series of parison molds carried upon the table, a reciprocative ring for engagement with the ends of the parison molds, a plunger mounted within the ring, a manually controlled actuating means for the plunger, an air-receiving shell in alinement with the plunger adapted to close the opposite end of the mold, a fixed cylinder disposed above the path of travel of the parison molds, a fluid controlled plunger actuated block carried by the cylinder for closing the upper ends of the molds, and a fluid controlled plunger actuated blow head in alinement with the block and disposed beneath the path of travel of the parison molds, the blow head being provided with means for admitting air to the mold cavity.

In testimony that I claim the foregoing I have hereunto set my hand at Milwaukee in the county of Milwaukee and State of Wisconsin in the presence of two witnesses.

ROMEO WILLIAMSON.

Witnesses:
GEO. W. YOUNG,
M. E. DOWNEY.

Copies of this patent may be obtained for five cents each, by addressing the "Commissioner of Patents, Washington, D. C."